US012528736B2

(12) United States Patent
Desboeufs et al.

(10) Patent No.: US 12,528,736 B2
(45) Date of Patent: Jan. 20, 2026

(54) METHOD FOR OBTAINING A SUBSTRATE COATED WITH A FUNCTIONAL LAYER

(71) Applicant: SAINT-GOBAIN GLASS FRANCE, Courbevoie (FR)

(72) Inventors: Nicolas Desboeufs, Compiegne (FR); Jean-Philippe Schweitzer, Chamant (FR); Arnaud Huignard, Compiegne (FR); Laurent Maillaud, Massy (FR); Lucie Devys, Paris (FR); Emmanuel Mimoun, Boulogne-Billancourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 517 days.

(21) Appl. No.: 17/426,518

(22) PCT Filed: Jan. 28, 2020

(86) PCT No.: PCT/FR2020/050124
§ 371 (c)(1),
(2) Date: Jul. 28, 2021

(87) PCT Pub. No.: WO2020/157423
PCT Pub. Date: Aug. 6, 2020

(65) Prior Publication Data
US 2022/0127190 A1 Apr. 28, 2022

(30) Foreign Application Priority Data
Jan. 29, 2019 (FR) ...................................... 1900793

(51) Int. Cl.
| | |
|---|---|
| C08K 3/04 | (2006.01) |
| C03C 17/36 | (2006.01) |
| C03C 17/38 | (2006.01) |
| C03C 17/42 | (2006.01) |
| C03C 23/00 | (2006.01) |
| C09D 133/08 | (2006.01) |

(52) U.S. Cl.
CPC .......... *C03C 17/3634* (2013.01); *C03C 17/38* (2013.01); *C03C 17/42* (2013.01); *C03C 23/001* (2013.01); *C08K 3/04* (2013.01); *C09D 133/08* (2013.01); *C03C 17/3626* (2013.01); *C03C 17/3642* (2013.01); *C03C 17/3644* (2013.01); *C03C 17/3649* (2013.01); *C03C 17/366* (2013.01); *C03C 17/3681* (2013.01); *C03C 17/3686* (2013.01); *C03C 2217/212* (2013.01); *C03C 2217/216* (2013.01); *C03C 2217/256* (2013.01); *C03C 2217/258* (2013.01); *C03C 2217/29* (2013.01); *C03C 2217/445* (2013.01)

(58) Field of Classification Search
CPC ..... C03C 17/3634; C03C 17/38; C03C 17/42; C08K 3/04; C03B 27/016; C09D 5/32; B23K 26/18
See application file for complete search history.

(56) References Cited

U.S. PATENT DOCUMENTS

| | | | | |
|---|---|---|---|---|
| 5,028,759 A | * | 7/1991 | Finley ................. | C03C 17/3673 219/203 |
| 5,096,785 A | * | 3/1992 | Somerhausen .......... | G02B 1/14 428/912.2 |
| 5,468,591 A | * | 11/1995 | Pearce .................... | G03F 7/202 503/227 |
| 5,519,542 A | * | 5/1996 | Yano ....................... | G02B 1/111 359/884 |
| 5,653,903 A | * | 8/1997 | Pinchok, Jr. ............. | H05B 3/86 219/547 |
| 2002/0176988 A1 | * | 11/2002 | Medwick ................ | C03C 17/38 428/521 |
| 2005/0079338 A1 | * | 4/2005 | Toyoda ................. | H01L 21/268 428/304.4 |
| 2008/0187708 A1 | * | 8/2008 | Decker .................. | C09D 5/004 428/339 |
| 2010/0316828 A1 | | 12/2010 | Baikerikar et al. | |
| 2012/0094075 A1 | * | 4/2012 | Peter ................... | C03C 17/3678 204/192.12 |

(Continued)

FOREIGN PATENT DOCUMENTS

| | | | | |
|---|---|---|---|---|
| EP | 2474583 A1 | * | 7/2012 | ......... C08G 59/4021 |
| WO | WO 2010/139908 A1 | | 12/2010 | |

(Continued)

OTHER PUBLICATIONS

Mimaki (TM) Safety Data Sheets, Product Name: UV ink LF-140 Black, 2022, retrieved from https://mimaki.com/archives/013/037-U070425%20%20UV%20ink%20LF-140%20Black_US_Ver.7.0.pdf on Feb. 9, 2024. (Year: 2022).*

(Continued)

*Primary Examiner* — Monique R Jackson
(74) *Attorney, Agent, or Firm* — Pillsbury Winthrop Shaw Pittman LLP

(57) ABSTRACT

A process for obtaining a material including a substrate coated on one of its sides with a coating including a functional layer, includes depositing the functional layer on the substrate, then depositing an absorbent layer on top of the functional layer, then performing a heat treatment by radiation, the radiation having at least one treatment wavelength between 200 and 2500 nm, the absorbent layer being in contact with air during the heat treatment, wherein the ab sorb ent layer ab sorbs at least 80% of the radiation used during the heat treatment and transmits less than 10% thereof.

19 Claims, No Drawings

(56) References Cited

U.S. PATENT DOCUMENTS

| | | | | |
|---|---|---|---|---|
| 2014/0059878 | A1* | 3/2014 | Bilaine | F26B 3/30 |
| | | | | 34/275 |
| 2014/0147598 | A1* | 5/2014 | Windrich | H01B 3/445 |
| | | | | 427/515 |
| 2015/0205085 | A1* | 7/2015 | Yamamoto | F24S 40/40 |
| | | | | 359/884 |
| 2018/0141858 | A1* | 5/2018 | Kharchenko | C03C 17/3607 |
| 2018/0355199 | A1* | 12/2018 | Stasiak | G03F 7/004 |
| 2019/0284447 | A1* | 9/2019 | Furuta | C09J 7/22 |
| 2020/0140326 | A1* | 5/2020 | Heurtefeu | C03C 17/009 |
| 2020/0385501 | A1* | 12/2020 | Tanaka | C08F 220/1804 |
| 2021/0395894 | A1* | 12/2021 | Saitoh | C23C 16/46 |

FOREIGN PATENT DOCUMENTS

| | | | | |
|---|---|---|---|---|
| WO | WO-2015185848 A1 * | 12/2015 | | C03C 17/002 |
| WO | WO-2018197802 A1 * | 11/2018 | | C03C 17/009 |

OTHER PUBLICATIONS

Kim, Materials and design of nanostructured broadband light absorbers for advanced light-to-heat conversion, Nanoscale, 2018, 10, pp. 21555-21574. (Year: 2018).*

Orel, Spectrally selective paint coatings: Preparation and characterization, 2001, Solar Energy Materials & Solar Cells 68, pp. 337-353. (Year: 2001).*

Wijewardane, A review on surface control of thermal radiation by paints and coatings for new energy applications, 2012, Renewable and Sustainable Energy Reviews 16, pp. 1863-1873. (Year: 2012).*

Bogaerts, Review Materials for photothermal solar energy conversion, 1983, Journal of Materials Science 18, pp. 2847-2875. (Year: 1983).*

International Search Report as issued in International Patent Application No. PCT/FR2020/050124, dated Apr. 8, 2020.

* cited by examiner

METHOD FOR OBTAINING A SUBSTRATE COATED WITH A FUNCTIONAL LAYER

CROSS-REFERENCE TO RELATED APPLICATIONS

This application is the U.S. National Stage of PCT/FR2020/050124, filed Jan. 28, 2020, which in turn claims priority to French patent application number 1900793 filed Jan. 21, 2019. The content of these applications are incorporated herein by reference in their entireties.

The invention relates to the obtaining of substrates coated with at least one functional layer.

Some functional layers require heat treatments, either to improve their properties or even to give them their functionality. By way of example, mention may be made of low-emissivity functional layers based on silver or on transparent conductive oxides (TCO), the emissivity and electrical resistivity of which are lowered following heat treatments. Photocatalytic layers based on titanium oxide are also more active after heat treatment, as the latter promotes crystal growth. Heat treatments also make it possible to create porosity in silica-based layers in order to lower their light reflection factor.

Application WO 2010/139908 discloses a heat treatment method using radiation, in particular infrared laser radiation, focused on the layer. Such a treatment allows the layer to be heated very quickly without significantly heating the substrate. Typically, the temperature at any point on the side of the substrate opposite the side carrying the layer does not exceed 150° C., or even 100° C., during the treatment. Other types of radiation, such as that from flash lamps, can also be used for the same purpose.

Some layers, however, absorb very little infrared radiation, so that most of the radiation energy passes through the material without significantly heating it. To overcome this, it has been proposed to add a radiation-absorbent layer to the coating to be treated.

In order to enable high-speed processing of wide substrates, such as jumbo-sized (6 m×3 m) flat glass sheets from float processes, it is necessary to have very long (>3 m) laser lines available. However, it is difficult in practice to ensure stable power over the entire line and over time. Over- and/or under-intensities of power along the laser line cause treatment inhomogeneities of the parts of the substrate passing beneath these areas compared with the rest of the substrate. The same is true of variations in the width of the laser line. Treatment inhomogeneities can also be caused by conveyor systems due to an irregular travel speed or to vibrations that cause the position of the substrate to vary with respect to the focal plane of the laser. For some layers, these treatment inhomogeneities may be sufficient to cause visible defects on the final product (in particular optical transmission variation creating a lineage in the direction of travel or perpendicular thereto). An identical phenomenon can appear when large-size substrates are treated using flash lamps, in particular in the overlapping of treatment areas.

On the other hand, variations in the conveying of the substrate, for example in the conveying speed or the position of the substrate with respect to the radiation source, can also cause the amount of energy impacting the coating to vary and thus affect treatment homogeneity.

The present invention proposes to further improve this process by the use of a layer which largely absorbs radiation and allows only a negligible amount of it to pass through.

The subject matter of the present invention is therefore a process for obtaining a material comprising a substrate coated on one of its sides with a coating comprising a functional layer, said process comprising:
  a step of depositing the functional layer on the substrate, then
  a step of depositing an absorbent layer on top of said functional layer, then
  a step of heat treatment by radiation means, said radiation having at least one treatment wavelength comprised between 200 and 2500 nm, said absorbent layer being in contact with air during this heat treatment step, characterized in that the absorbent layer absorbs at least 80% of the radiation used during the heat treatment and transmits less than 10% thereof.

The subject matter of the present invention is therefore a process for obtaining a material comprising a substrate coated on one of its sides with a coating comprising a functional layer, said process comprising:
  a step of depositing the functional layer on the substrate, then
  a step of depositing an absorbent layer on top of said functional layer, then
  a step of heat treatment by radiation means, said radiation having at least one treatment wavelength comprised between 200 and 2500 nm, said absorbent layer being in contact with air during this heat treatment step, characterized in that the absorbent layer has an absorption/transmission ratio of the radiation used during the heat treatment greater than 8.

The present invention also has as its subject matter a process for obtaining a material comprising a substrate coated on one of its sides with a coating comprising a functional layer, said process comprising:
  a step of depositing the functional layer on the substrate, then
  a step of depositing an absorbent layer on top of said functional layer, then
  a step of heat treatment by radiation means, said radiation having at least one treatment wavelength comprised between 200 and 2500 nm, said absorbent layer being in contact with air during this heat treatment step, characterized in that the absorbent layer comprises at least 5%, preferably at least 10%, more preferentially at least 30%, indeed at least 50%, or even at least 60%, by weight of carbon particles.

Another subject matter of the invention is a material comprising a substrate coated on at least one of its sides with a coating comprising a functional layer and an absorbent layer located above the functional layer, characterized in that the absorbent layer comprises at least 5%, preferably at least 10%, more preferentially at least 30%, indeed least 50%, or even at least 60%, by weight of carbon particles. This material corresponds to an intermediate material of the process according to the invention, the absorbent layer generally being removed at the end of the heat treatment or after subsequent storage.

All the features or all the embodiments described below apply to both the process and the material according to the invention.

Absorption is defined as being equal to the value of 100% minus the transmission and reflection (spectral and diffuse) of the layer. It can in a known way be deduced from measurements made with a spectrophotometer equipped with an integrating sphere. The absorbent layer absorbs at least 80%, preferably at least 85%, or even at least 90% of the radiation used during the heat treatment. Most of the energy of the radiation is thus absorbed by the absorbent layer and transferred to the coating, in particular the functional layer, by thermal diffusion. The absorbent layer allows only a negligible amount of the radiation to pass through. The absorbent layer typically transmits less than 10%, or even less than 5% or even less than 1% of the radiation). The rest of the coating, in particular the functional layer, is thus directly impacted by only a negligible portion of the radiation, which has the effect of greatly reducing the sensitivity of the coating to treatment inhomogeneities. Without wishing to be bound to any theory, it seems that, by a process of absorption-diffusion of energy, the absorbent layer according to the invention allows a more homogeneous distribution of energy to the coating compared with known processes in which, even in the presence of absorbent layers, a non-negligible portion of the radiation directly impacts the coating. The result is an attenuation or even elimination of defects, in particular optical defects, attributed to treatment inhomogeneities due to variations in the power density of the radiation and/or irregularities in the conveying of the substrate. The improved tolerance with respect to treatment inhomogeneities obtained using the process according to the invention also makes it possible to lower the requirements for optical and/or conveying systems, thereby reducing investment and maintenance costs.

The substrate is preferably a sheet of glass, of glass-ceramic, or of an organic polymeric material. It is preferably transparent, colorless (in which case it can be clear or extra-clear glass) or colored, for example blue, green, gray or bronze. The glass is preferably soda-lime-silica type glass, but it can also be borosilicate or alumino-borosilicate type glass, in particular for high-temperature applications (oven doors, fireplace inserts, fire-resistant glazing). The preferred polymeric organic materials are polycarbonate or poly(methyl methacrylate) or polyethylene terephthalate (PET). The substrate advantageously has at least one dimension greater than or equal to 1 m, or even 2 m or 3 m. The thickness of the substrate generally varies between 0.5 mm and 19 mm, preferably between 0.7 and 9 mm, in particular between 1 and 8 mm, or even between 4 and 6 mm. The substrate can be flat or curved, or even flexible.

The glass substrate is preferably of the float type, i.e. it was obtainable by a process consisting of pouring the molten glass onto a bath of molten tin (called a float bath). In this case, the layer to be treated can be deposited on the tin side as well as on the atmosphere side of the substrate. The "atmosphere" and "tin" sides are understood to be the sides of the substrate which have been in contact with the atmosphere in the float bath and in contact with the molten tin, respectively. The tin side contains a small surface amount of tin that has diffused into the glass structure. The glass substrate can also be obtained by lamination between two rollers, a technique which makes it possible in particular to print patterns on the surface of the glass.

Clear glass is understood to mean soda-lime-silica glass obtained by floatation, not coated with layers, and having a light transmission of the order of 90%, a light reflection of the order of 8% and an energy transmission of the order of 83% for a thickness of 4 mm. The light and energy transmissions and reflections are as defined by standard NF EN 410. Typical clear glasses are for example marketed under the name SGG Planilux by the firm Saint-Gobain Glass France or under the name Planibel Clair by the firm AGC Flat Glass Europe. These substrates are typically used for the manufacture of low-emissivity glass.

The functional layer, and possibly all the layers deposited on or under it, are typically thin layers, in the sense that their thickness is typically from 0.5 nm to 10 µm, more generally from 1 nm to 1 µm. "Thickness" means physical thickness throughout the present text.

The functional layer and the absorbent layer are preferably deposited on at least 90% of the substrate surface. In certain embodiments, the absorbent layer can however be deposited on only part of the substrate surface, in particular on a peripheral region, on a central region, or so as to create a pattern, for example a periodic pattern or a logo.

In the present application, the terms "under" or "below" and "over" or "above", associated with the position of a first layer relative to a second layer, mean that the first layer is closer to, or more distant from, the substrate than the second layer. However, these terms do not exclude the presence of other layers between said first and second layers. On the contrary, a first layer "in direct contact" with a second layer means that no other layer is disposed between them. The same is true of the terms "directly on" or "directly above" and "directly under" or "directly below". Thus, it is understood that, unless otherwise indicated, other layers may be interposed between each layer in the stack.

Throughout the text, "based on" is understood to mean that a layer generally comprises at least 50% by weight of the element considered (metal, oxide, etc.), preferably at least 60% and even 70% or 80%, or even 90%, 95% or 99% by weight of that element. In certain cases, the layer consists of this element, except for impurities.

The functional layer preferably provides the coated substrate with at least one functionality selected from low emissivity, low electrical resistivity, anti-reflective effect, self-cleaning or easy cleaning.

Preferably the functional layer is selected from layers based on a metal, in particular silver, layers based on titanium oxide, layers based on silica or layers based on a transparent, electrically-conductive oxide.

The functional layer may be the only layer deposited on the substrate (in addition to the absorbent layer). Alternatively, the functional layer can be comprised in a stack of thin films. A "coating" is defined as the assembly comprising the functional layer(s), the absorbent layer and, if need be, any other layer deposited on the same side of the substrate. The coating may comprise a plurality of functional layers, in particular two, three, or four functional layers.

The thickness of the or each functional layer is typically comprised between 1 nm and 5 µm, in particular between 2 nm and 2 µm, more particularly between 10 nm and 1 µm.

According to a preferred embodiment, the functional layer is based on a metal, typically silver or even gold, molybdenum or niobium. The functional layer preferably consists of this metal. Such metals have low emissivity and low electrical resistivity properties, so that the coated substrates can be used for the manufacture of heat-insulating glazing, heated glazing or electrodes. The thickness of the functional layer is then preferably comprised in the range from 2 to 20 nm.

In this embodiment, the coating comprises at least one metallic functional layer, for example one, two or three functional layers, each generally being disposed between at least two dielectric layers, typically layers of oxide, nitride or oxynitride, for example layers of silicon nitride, zinc oxide and/or tin oxide, titanium oxide etc. This type of coating is preferably deposited entirely by cathode sputtering, in particular assisted by a magnetic field (magnetron process)—with the possible exception of the absorbent layer.

According to another preferred embodiment, the functional layer is a layer based on titanium oxide, in particular a layer consisting or essentially consisting of titanium oxide.

Thin films based on titanium oxide have the distinctive feature of being self-cleaning, facilitating the degradation of organic compounds under the action of ultraviolet radiation (photocatalysis phenomenon) and the removal of mineral dirt (dust) under the action of a stream of water. Titanium dioxide crystallized in the anatase form is much more effective in terms of degradation of organic compounds than amorphous titanium dioxide or titanium dioxide crystallized in the rutile or brookite form. Titanium oxide can optionally be doped with a metal ion, for example a transition metal ion, or with nitrogen, carbon, fluorine, etc. atoms. Titanium oxide can also be sub-stoichiometric or over-stoichiometric in oxygen ($TiO_2$ or $TiO_x$).

The layer based on titanium oxide is preferably deposited by magnetron cathode sputtering. However, this technique does not produce very active layers, as the titanium oxide they contain is crystallized little if at all. Heat treatment is then necessary to give appreciable self-cleaning properties. In order to improve these properties, it is preferable, particularly when the substrate is intended to undergo a prolonged heat treatment, for example a quenching or curving treatment, to insert between the substrate and the titanium oxide layer at least one alkali migration barrier layer, selected in particular from the layers based on silica, silicon oxycarbide, alumina, silicon nitride.

According to another preferred embodiment, the functional layer is a layer based on a transparent, electrically-conductive oxide. The transparent, electrically-conductive oxide is preferably selected from indium tin oxide (ITO) layers, aluminum- or gallium-doped zinc oxide layers and fluorine- or antimony-doped tin oxide layers.

This type of layer provides properties of electrical conduction but also of low emissivity, allowing the material to be used in the manufacture of insulating glass units, anti-condensation glass units, or electrodes, for example for photovoltaic cells, display screens or lighting devices.

According to yet another preferred embodiment, the functional layer is a silica-based layer. This type of layer absorbs little in the wavelength range considered, in particular in the near infrared range, so that in the absence of an absorbent layer the heat treatment is ineffective.

The silica-based layer is preferably, after heat treatment, essentially made up or even made up of silica. The silica-based layer is advantageously anti-reflective, in the sense that the light reflection factor on the layer side is at most 6%, in particular 5% after heat treatment, when the layer is deposited on only one side of a glass substrate (the value therefore takes into account the reflection of the opposite uncoated side, which is about 4%).

According to a first variant, the silica-based layer comprises, prior to heat treatment, silicon, oxygen, carbon and optionally hydrogen, the latter two elements being at least partially removed during the heat treatment so as to obtain a porous layer essentially consisting of silica. This layer is preferentially deposited by magnetron cathode sputtering of a silicon or silica target or by plasma-assisted chemical vapor deposition using an organometallic compound such as hexamethyldisiloxane as silicon precursor.

According to a second variant, the silica-based layer comprises, prior to heat treatment, a silica matrix and pore-forming agents, the latter being removed during the heat treatment so as to obtain a porous layer essentially consisting of silica. The pore-forming agents are preferably organic, in particular polymeric, for example poly(methyl methacrylate), the average size of the pore-forming agents preferably being comprised in the range from 20 to 200 nm. This layer is preferentially deposited by a sol-gel type process.

The functional layer can be obtained by any type of thin-film deposition process. These may for example be processes such as sol-gel, pyrolysis (liquid or solid), chemical vapor deposition (CVD), in particular plasma-assisted chemical vapor deposition (APCVD), optionally under atmospheric pressure (APPECVD), evaporation, cathode sputtering, in particular assisted by a magnetic field (magnetron process). In the latter process, a plasma is created under a high vacuum in the vicinity of a target containing the chemical elements to be deposited. The active species of the plasma, by bombarding the target, tear off said elements, which are deposited on the substrate forming the desired thin film. This process is said to be "reactive" when the layer consists of a material resulting from a chemical reaction between the elements torn from the target and the gas contained in the plasma. The major advantage of this process lies in the possibility of depositing on the same line a very complex stack of layers by successively running the substrate under different targets, generally in one and the same device. It is thus possible to obtain in this way the complete stack, containing the absorbent layer if need be.

The absorbent layer typically includes an agent that absorbs at the wavelengths of the radiation. It is preferably in the form of particles. The absorbing agent can be any inorganic or organic pigment that absorbs at the wavelengths of the radiation. Examples of organic pigments include bitumen, perylenes such as perylene black, perylene red, perylene burgundy, quinacridones such as quinacridone magenta, quinacridone red, phthalocyanines such as copper phthalocyanine, brominated copper phthalocyanine, azocarbons such as methyl orange, phenylazophenol, tartrazine, carbonaceous particles such as carbon black or graphite. Examples of mineral pigments include metal oxides such as iron oxide, manganese oxide, titanium dioxide, zinc oxide, metal sulfides such as sodium sulfide, cadmium sulfide or mercury sulfide. The amount of absorbing agent in the absorbent layer as well as the thickness of the absorbent layer must be adapted according to the nature of the absorbing agent to obtain an absorbent layer according to the invention absorbing at least 80% of the radiation.

The absorbing agent is preferably selected from carbon particles. They indeed have the advantage of having a wide absorption spectrum. Absorbent layers comprising carbon particles can therefore be adapted to radiation sources emitting in different wavelengths. The carbon particles can be selected from carbon black, graphite, graphene, carbon nanotubes, or mixtures thereof. However, carbon black particles are preferred for economic reasons in particular. Carbon particles typically have an average size of 100 to 1500 nm, preferably 150 to 1200 nm. The particle size is determined by dynamic light scattering.

The absorbent layer preferably comprises at least 5%, more preferentially at least 8%, or even at least 10%, by weight of absorbing agent. In a particular embodiment, the absorbent layer may be mainly based on absorbing agent, i.e. it may comprise at least 50%, preferably at least 60%, by weight of absorbing agent. It may comprise up to 90% or even 80% by weight of absorbing agent.

The absorbent layer typically has a thickness of 0.5 µm, or even 0.7 µm, 0.8 µm, or even 0.8 µm, to 50 µm, or even 20 µm, 10 µm, or even 5 µm.

In a first embodiment, the absorbent layer comprises an absorbing agent dispersed in an organic matrix. The organic matrix may be based on polymers which are water-soluble, water-dispersible and/or can be at least partially removed by thermal decomposition during the heat treatment according to the invention. In this embodiment, the absorbent layer typically has a thickness of 1 to 50 µm, preferably 2 to 30 µm, or even 3 to 10 µm.

Examples of suitable organic matrices include polymers comprising one or more homopolymers or copolymers of starch, casein, acrylates, acrylamide, glycols such as ethylene glycol, vinyl acetate, vinyl alcohol, vinylpyrrolidone, styrene/acrylic acid copolymers, ethylene/acrylic acid copolymers, cellulose or derivatives thereof such as methylcellulose, ethylcellulose, hydroxypropylmethylcellulose or carboxymethylcellulose.

In a first variant, the organic matrix is soluble and/or dispersible in water. The absorbent layer can then be obtained from a coating solution, preferably water-based, comprising a water-soluble or water-dispersible film-forming polymer, preferably based on vinyl alcohol, and an absorbing agent. The coating solution typically comprises up to 30% by weight, preferably up to 24% by weight, or even 5 to 12% by weight, of film-forming polymer based on the total weight of the coating solution. The amount of absorbing agent in the coating solution is determined according to the desired amount in the absorbent layer. It is typically 5% to 20% by weight based on the total weight of dry matter. The coating solution may also comprise conventional additives such as surfactants, rheological agents, defoaming agents, or mineral fillers.

The coating solution can be deposited on the coated substrate by any conventional liquid deposition method such as spray coating, flow coating, curtain coating or roller coating. It may also be deposited by printing methods such as inkjet printing, flexography or screen printing, in particular for obtaining patterns.

In a second variant, the organic matrix is neither soluble or nor dispersible in water. In this case, the organic matrix is preferably based on acrylate polymer. The absorbent layer is then typically obtained from a liquid composition comprising (meth)acrylate compounds, preferably selected from monomers, oligomers, prepolymers or polymers comprising at least one (meth)acrylate function. The liquid composition, preferably essentially solvent-free, can be deposited on the coated substrate by any conventional liquid-phase deposition method, in particular by roller coating. It can then be polymerized, preferably by UV irradiation, by firing or by electron-beam bombardment.

"(Meth)acrylate" means acrylate or methacrylate equivalent. "(Meth)acrylate compounds" means esters of acrylic or methacrylic acid with at least one acroyl (CH2=CH—CO—) or methacroyl (CH2=CH(CH3)—CO—) function. These esters may be monomers, oligomers, pre-polymers or polymers. The (meth)acrylate compounds used may be monofunctional or polyfunctional (meth)acrylates, including di-, tri-, tetra-, penta- or hexa-functional (meth)acrylates. Examples of such compounds are: monofunctional (meth)acrylates such as methyl(meth)acrylate, ethyl(meth)acrylate, n- or tert-butyl(meth)acrylate, hexyl(meth)acrylate, cyclohexyl(meth)acrylate, 2-ethylhexyl(meth)acrylate, benzyl (meth)acrylate, 2-ethoxyethyl(meth)acrylate, phenyloxyethyl(meth)acrylate, hydroxyethylacrylate, hydroxypropyl (meth)acrylate, vinyl(meth)acrylate caprolactone acrylate, isobornyl methacrylate, lauryl methacrylate, polypropylene glycol monomethacrylate,

- difunctional (meth)acrylates such as 1,4-butanediol di(meth)acrylate, ethylene dimethacrylate, 1,6-hexandiol di(meth)acrylate, bisphenol A di(meth)acrylate, trimethylolpropane diacrylate, triethylene glycol diacrylate, ethylene glycol di(meth)acrylate, polyethylene glycol di(meth)acrylate, tricyclodecane dimethanol diacrylate,
- trifunctional (meth)acrylates such as trimethylolpropane trimethacrylate, trimethylolpropane triacrylate, pentaerythritol triacrylate, ethoxylated trimethylolpropane triacrylate, trimethylolpropane trimethacrylate, tripropylene glycol triacrylate,
- higher functionality (meth)acrylates such as pentaerythritol tetra(meth)acrylate, ditrimethylpropane tetra(meth)acrylate, dipentaerythritol penta(meth)acrylate or hexa(meth)acrylate.

In addition to the (meth)acrylate compounds, the liquid composition comprises an amount of absorbing agent corresponding to the desired amount in the absorbent layer. It is typically 5% to 20% by weight of the total weight. The liquid composition further comprises a polymerization initiator, the nature of which depends on the type of polymerization selected. For example, in the case of thermal polymerization, initiators of the benzoyl peroxide type are used. In the case of curing by UV radiation, so-called photoinitiators are used. The liquid composition may comprise other additives such as mineral fillers or rheological agents. According to an advantageous embodiment, the temporary protective layer does not contain any mineral fillers other than carbon black, nor additives that cannot be removed during heat treatment, such as organic compounds containing silicon of the siloxane type.

In a second embodiment, the absorbent layer consists mainly of the absorbing agent, i.e. it typically comprises 50-90% by weight of absorbing agent. In this case, the absorbent layer is generally obtained from a suspension of absorbing agent in a solvent (in particular alcoholic, aqueous or a water-alcohol mixture), optionally with the addition of surfactants. The suspension typically comprises 1 to 10% by weight of absorbing agent. The suspension can be deposited on the coated substrate by any conventional liquid deposition method such as spray coating, flow coating, curtain coating or roller coating. It may also be deposited by printing methods such as inkjet printing, flexography or screen printing, in particular for the obtaining of patterns. The deposit is then dried to remove the solvent and obtain an absorbent layer typically having a thickness of 0.5 to 5 µm, preferably 0.7 to 4 µm, or even 0.8 to 3 µm.

The absorbent layer is in contact with an oxidizing atmosphere, generally air, during the heat treatment step according to the invention. In other words, the absorbent layer constitutes the last layer of the coating. In particular, in the case of a plurality of functional layers, the absorbent layer is located above the functional layer furthest from the substrate.

During the heat treatment according to the invention, the radiation is largely absorbed by the absorbent layer and the absorbed energy is returned by diffusion to the rest of the coating, thus allowing the coating to be cured without significant direct impact of the coating, in particular the functional layer, by the radiation.

After the heat treatment step the absorbent layer can be easily removed by washing with a solvent, preferably water. Indeed, even in the case of an absorbent layer based on an organic matrix which is insoluble or dispersible in water, the heat treatment has the effect of at least partially decomposing said matrix, thus allowing the residues to be removed by simple washing.

Regardless of the embodiment, the use of carbon particles as an absorbing agent is advantageous, as these can be partially removed during the heat treatment according to the invention. Thus, the higher the proportion of carbon particles in the absorbent layer, the more easily the residue of the absorbent layer after heat treatment can be removed. Moreover, in the case of a layer mainly based on carbon particles, the combination of a high concentration of carbon particles combined with the strong absorption properties of these particles makes it possible to obtain very absorbent and relatively thin layers, promoting heat exchanges with the coating, and consequently the efficiency of the treatment. Absorbent layers mainly based on carbon particles are preferred for these reasons.

During heat treatment, the radiation is preferably selected from laser radiation, radiation from at least one infrared lamp, or radiation from at least one flash lamp.

According to a first preferred embodiment, the radiation comes from at least one flash lamp.

Such lamps are usually in the form of sealed glass or quartz tubes filled with a noble gas and fitted with electrodes at their ends. A short electrical pulse, obtained by discharging a capacitor, causes the gas to ionize and produce a particularly intense, incoherent light. The emission spectrum generally comprises at least two emission lines, preferably a continuous spectrum with a maximum emission in the near ultraviolet and extending to the near infrared. In this case, the heat treatment uses a continuum of treatment wavelengths.

The lamp is preferably a xenon lamp. It can also be an argon, helium or krypton lamp. The emission spectrum preferably comprises several lines, in particular at wavelengths ranging from 160 to 1000 nm.

The flash duration is preferably comprised in the range from 0.05 to 20 milliseconds, in particular from 0.1 to 5 milliseconds. The repetition rate is preferably comprised in the range from 0.1 to 5 Hz, in particular from 0.2 to 2 Hz.

The radiation can be from several lamps disposed side by side, for example 5 to 20 lamps, or even 8 to 15 lamps, so that a larger area can be treated simultaneously. In this case, all the lamps can emit flashes simultaneously.

The or each lamp is preferably disposed transversely to the longer sides of the substrate. The or each lamp preferably has a length of at least 1 m, in particular 2 m and even 3 m, so that large substrates can be treated. The use of an absorbent layer according to the invention nevertheless makes it possible to use modules of shorter lengths combined with each other to achieve the desired length without, however, affecting the homogeneity of the treatment generally induced by the overlapping areas between the irradiation areas of each module.

The capacitor is typically charged to a voltage of 500 V to 500 kV. The current density is preferably at least 4000 A/cm$^2$. The total energy density emitted by the flash lamps, relative to the surface of the coating, is preferably comprised between 1 and 100 J/cm$^2$, in particular between 1 and 30 J/cm$^2$, or even between 5 and 20 J/cm$^2$.

According to a second preferred embodiment, the radiation is laser radiation, in particular laser radiation in the form of at least one laser line, preferably focused on the absorbent layer.

Laser radiation is preferably generated by modules comprising one or more laser sources as well as shaping and redirecting optics.

The laser sources are typically laser diodes or fiber lasers, including fiber, diode or disk lasers. Laser diodes allow high power densities to be achieved economically in relation to the electrical power supply, with a small footprint. Fiber lasers are even more compact, and the linear power obtained can be even higher, but at a higher cost. Fiber lasers are defined as lasers in which the place of generation of the laser light is spatially offset from the place of delivery, the laser light being delivered by means of at least one optical fiber. In the case of a disk laser, the laser light is generated in a resonant cavity in which the emitting medium is located which is in the form of a disk, for example a thin disk (about 0.1 mm thick) of Yb:YAG. The light thus generated is coupled into at least one optical fiber directed towards the treatment site. The laser can also be fiber-based, in the sense that the amplification medium is itself an optical fiber. Fiber or disk lasers are preferably optically pumped using laser diodes. The radiation from the laser sources is preferably continuous. Alternatively, it can be pulsed.

The wavelength of the laser radiation, thus the treatment wavelength, is preferably comprised in the range from 200 to 2500 nm, preferably 500 to 1300 nm, in particular from 800 to 1100 nm. Power laser diodes emitting at one or more wavelengths selected from 808 nm, 880 nm, 915 nm, 940 nm or 980 nm have proven to be particularly suitable. In the case of a disk laser, the treatment wavelength is for example 1030 nm (emission wavelength for a Yb:YAG laser). For a fiber laser, the treatment wavelength is typically 1070 nm.

The number of laser lines and their disposition are advantageously selected so that the entire width of the substrate is treated.

Several disjointed lines can be used, for example in a staggered or bird's-eye arrangement. In general, however, the laser lines are combined to form a single laser line. In the case of narrow substrates, this laser line can be generated by a single laser module. On the other hand, in the case of large substrate widths, for example greater than 1 m, or 2 m and even 3 m, the laser line results advantageously from the combination of a plurality of elementary laser lines, each generated by independent laser modules. The length of these elementary laser lines typically ranges from 10 to 100 cm, in particular from 30 to 75 cm, or even from 30 to 60 cm. The elementary lines are preferably disposed in such a way that they partially overlap in the longitudinal direction and preferably have an offset in the width direction, said offset being less than half the sum of the widths of two adjacent elementary lines.

"Length" means the longest dimension of the line, measured on the surface of the coating in a first direction, and "width" means the dimension in the second direction, perpendicular to the first direction. As is customary in the field of lasers, the width w of the line corresponds to the distance (in this second direction) between the beam axis (where the radiation intensity is maximum) and the point where the radiation intensity is $1/e^2$ times the maximum intensity. If the longitudinal axis of the laser line is named x, a width distribution along this axis, named w(x), can be defined.

The average width of the or each laser line is preferably at least 35 µm, preferably comprised in the range from 40 to 100 µm, or even from 40 to 70 µm, or in the range from 110 µm to 30 mm. Throughout the present text "average" means the arithmetic average. Over the entire length of the line, the distribution of widths is preferably narrow in order to maximally limit any heterogeneity of treatment. Thus, the difference between the largest and smallest width is preferably no more than 10% of the value of the average width. This figure should preferably be at most 5% and even 3%. In certain embodiments this difference can be greater than 10%, for example from 11 to 20%.

The linear power of the laser line is preferably at least 50 W/cm, advantageously 100 or 150 W/cm, in particular 200 W/cm, or even 300 W/cm and even 350 W/cm. It is even advantageously at least 400 W/cm, in particular 500 W/cm, or even 600, 800 or 1000 W/cm. Linear power is measured at the point where the or each laser line is focused on the coating. It can be measured by placing a power detector along the line, for example a calorimeter power meter, such as the Beam Finder S/N 2000716 from the firm Coherent Inc. The power is advantageously distributed homogeneously along the entire length of the or each line. Preferably, the difference between the highest and lowest power is less than 10% of the average power.

The absorbent layer according to the invention is suitable for laser treatment and has at least one of the following characteristics 1 to 3 or combinations thereof, in particular 1+2, 1+3 or 1+2+3:
1—an average line width of 110 µm to 30 mm;
2—a line power of 50 to 290 W/cm;
3—a difference between the largest and the smallest width of 11% to 20% of the value of the average width.

According to a third preferred embodiment, the radiation is radiation from one or more infrared lamps. The one or more infrared lamps preferably have a power of 50 to 150 $W/m^2$. Their emission spectrum typically has at least 80% of the intensity between 400 and 1500 nm with a maximum between 800 and 1000 nm.

In order to treat the entire surface of the substrate, a relative displacement between the radiation source and said substrate is preferably created. Preferably, in particular for large-size substrates, the or each radiation source (in particular laser line or flash lamp) is fixed, and the substrate is in motion, so that the relative displacement speeds will correspond to the running speed of the substrate. Preferably, the or each laser line is substantially perpendicular to the direction of movement.

The process according to the invention has the advantage of heating only the coating, without significant heating of the entire substrate. This eliminates the need for slow and controlled cooling of the substrate before cutting or storage. During the entire heat treatment step, the temperature at any point on the side of the substrate opposite that bearing the functional layer is preferably at most 150° C., in particular 100° C. and even 50° C.

The maximum temperature to which each point of the coating is subjected during heat treatment is preferably at least 300° C., in particular 350° C., or even 400° C., and even 500° C. or 600° C., and preferably less than 800° C., or even less than 700° C. The maximum temperature is in particular experienced at the moment when the point of the coating in question passes below the laser line or is irradiated by the flash lamp. At any given moment, only those points on the surface of the coating which are below the laser line or under the flash lamp and in its immediate vicinity (for example within 1 millimeter) are normally at a temperature of at least 300° C. For distances to the laser line (measured in the direction of travel) greater than 2 mm, in particular 5 mm, including downstream of the laser line, the temperature of the coating is normally at most 50° C., and even 40° C. or 30° C.

Each point of the coating undergoes the heat treatment (or is brought to the maximum temperature) for a period of time advantageously comprised in the range from 0.05 to 10 ms, in particular from 0.1 to 5 ms, or from 0.1 to 2 ms. In the case of treatment by means of a laser line, this duration is determined both by the width of the laser line and by the relative speed of movement between the substrate and the laser line. In the case of treatment by means of a flash lamp, this time corresponds to the duration of the flash.

The substrate can be set in motion by any mechanical conveying means, for example by means of belts, rollers, translating plates. The conveying system allows the speed of the movement to be controlled and regulated. If the substrate is made of flexible organic polymeric material, the movement can be carried out by means of a film feed system in the form of a succession of rollers.

All relative positions of the substrate and the laser are of course possible, as long as the substrate surface can be properly irradiated. The substrate will most often be disposed horizontally, but it can also be disposed vertically, or at any possible inclination. When the substrate is disposed horizontally, the treatment device is generally disposed to irradiate the upper side of the substrate. The treatment device may also irradiate the underside of the substrate. In this case, the substrate support system, and optionally the substrate conveying system when the substrate is in motion, must allow radiation to pass through the area to be irradiated. This is the case, for example, when using laser radiation and conveyor rollers: since the rollers are set apart, it is possible to arrange the laser in an area between two successive rollers.

The speed of the relative displacement movement between the substrate and the or each radiation source (including the or each laser line) is advantageously at least 2 m/min, in particular 5 m/min and even 6 m/min or 7 m/min, or 8 m/min and even 9 m/min or 10 m/min. This can be adjusted according to the nature of the functional layer to be treated and the power of the radiation source used.

The heat treatment device can be integrated into a layer deposition line, for example a magnetic field assisted sputtering deposition line (magnetron process), or a chemical vapor deposition (CVD) line, such as plasma assisted chemical vapor deposition (PECVD), vacuum or atmospheric pressure chemical vapor deposition (APPECVD). The line typically comprises substrate handling devices, a deposition facility, optical control devices, stacking devices. The substrates, in particular glass substrates, are passed, for example on conveyor rollers, successively in front of each device or each installation.

The heat treatment device is preferably located immediately after the coating deposition installation, for example at the outlet of the deposition installation. The coated substrate can thus be treated in-line after the coating has been deposited, at the exit of the deposition installation and before the optical control devices, or after the optical control devices and before the substrate stacking devices.

The heat treatment device can also be integrated into the deposition installation. For example, the laser or flash lamp can be introduced into one of the chambers of a cathode sputtering deposition installation, in particular into a chamber where the atmosphere is rarefied, in particular at a pressure comprised between $10^{-6}$ mbar and $10^{-2}$ mbar. The heat treatment device can also be disposed outside the deposition installation, but in such a way as to treat a substrate situated inside said installation. For this purpose, it is sufficient to provide a porthole transparent to the wavelength of the radiation used, through which the radiation would come to treat the layer. It is thus possible to treat a functional layer (for example a silver layer) before the subsequent deposition of another layer in the same installation.

Whether the heat treatment device is outside or integrated into the deposition facility, these processes, referred to as in-line or continuous processes, are preferable to a rework process in which it would be necessary to stack the glass substrates between the deposition step and the heat treatment.

However, rework processes may be of interest in cases where the heat treatment according to the invention is carried out in a different place from that in which the deposit is made, for example in a place where the processing of glass is carried out. The heat treatment device can therefore be integrated into lines other than the coating line. It can, for example, be integrated into a production line for multiple glazing (in particular double or triple glazing), into a production line for laminated glazing, or into a production line for curved and/or tempered glazing. Laminated, curved or tempered glass can be used both as building and automotive glazing. In these different cases, the heat treatment according to the invention is preferably carried out before the multiple or laminated glazing is produced. However, the heat treatment can be carried out after the double glazing or laminated glazing has been produced.

The heat treatment device is preferably disposed in an enclosed enclosure to ensure personal safety by avoiding any contact with radiation and to avoid any pollution, in particular of the substrate, the optics or the treatment area.

The process according to the invention may thus include a washing step after the heat treatment step. This washing step carried out using a solvent, typically water, removes the residue of the absorbent layer after heat treatment. In a first embodiment, the washing can take place immediately after the heat treatment step. In another embodiment, the washing step is not carried out immediately after the heat treatment step. Indeed, it has been noticed that the residue of the absorbent layer after heat treatment can be used as a substitute for the use of a spacer between the treated substrates during storage. In this case, the process according to the invention preferably does not include a washing step between the heat treatment step and subsequent storage of the substrate. The washing step can be carried out just before integration operations, for example in a glazing, in particular after storage and possible transport of the substrates. This is particularly advantageous when the absorbing agent is selected from carbon particles. In this case, the absorbent layer residue includes carbon particles not bound to the substrate, which act as lubricants when the treated substrates are stacked together.

The present invention also has as its subject matter a substrate coated with a coating comprising a functional layer, said coating being surmounted by an absorbent layer according to the invention having undergone a heat treatment. Such a treated layer may comprise, in particular, carbon particles not bonded to the substrate.

In the case of a glass substrate, the material obtained by the process according to the invention may form or be integrated into a glazing, in particular for building or transport. This may be, for example, multiple glazing (double, triple, etc.), monolithic glazing, curved glazing, laminated glazing. In the case of self-cleaning layer based on titanium oxides, the material can in particular constitute the first sheet of a multiple glazing, the functional layer being positioned opposite 1 of said glazing. In the case of silver-based layers, the functional layer is preferably positioned inside the multiple glazing.

The material obtained by the process according to the invention can further be integrated into a photovoltaic cell. In the case of anti-reflection silica-based layers as mentioned above, the material coated with these can form the front side of a photovoltaic cell.

The material obtained by the process according to the invention can further be integrated into a display screen or lighting device or a photovoltaic cell as a substrate provided with an electrode.

The invention is illustrated with the following non-limiting examples of embodiments.

All tests are carried out on a glazing formed by a sheet of Planiclear® glass with a low-emissivity stack on one of its sides consisting of the following successive layers (the values in brackets correspond to the thickness of the layers expressed in nm):

//TiO$_2$(24)/ZnO(4)/Ag(13.5)/Ti(0.4)/ZnO(4)/TiO$_2$(12)/Si$_3$N$_4$(30)

Five samples are prepared (Ex1 and Ex2 according to the invention, and comparative CEx1, CEx2 and CEx 3) which differ by the absorbent overlayer deposited before laser treatment.

For Example 1, an absorbent layer comprising carbon black particles dispersed in an organic matrix based on an acrylate polymer was deposited as follows. 7% by weight of carbon black particles were dispersed in an acrylate polymer suspension. The suspension was deposited by roller coating and dried at room temperature.

For Example 2, a 1 μm layer of carbon black particles was deposited as follows. 2% by weight of carbon black particles having an average diameter of 500 nm were dispersed in an aqueous surfactant solution by means of ultrasonic treatment. The suspension was deposited with a scraper and dried at room temperature.

For Comparative Example 1, a 5 μm layer of a black ink marketed as LF-140 BLACK by Mimaki Engineering was applied by roller and dried at room temperature.

For Comparative Example 2, a 2 nm SnZn metal layer was deposited by cathode sputtering.

For Comparative Example 3, a 10 nm carbon layer was deposited by cathode sputtering.

The samples were subjected to heat treatment by a laser line having the following characteristics: wavelength 915 nm and 980 nm; line length 30 cm; line width at the focal plane 45 μm with a variation of ±10 μm along the line. The running speed of the substrates, set at 36 m/min, shows a variation of ±5% during processing. The line power of the laser, which has a homogeneity of ±10% along the line, was set so as to obtain a comparable gain of at least 20% for each of the examples.

The conductivity gain is defined as the difference between the initial R□ (before heat treatment) and the final R□ (after heat treatment) relative to the initial R□:

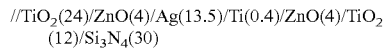

$Gain(\%) = (R\square_{initial} - R\square_{final})/R\square_{initial}$

The table below shows, for each sample, the absorption of the absorbent layer at the wavelengths of the laser radiation, the conductivity gain and the visibility of defects due to treatment inhomogeneities after heat treatment.

The visibility of defects due to treatment inhomogeneities is evaluated by an operator with the naked eye according to the following scoring system:
++: no defects are visible to the naked eye,
+: localized defects, limited to certain areas of the sample, are perceptible to the naked eye under intense diffuse illumination (>800 lux),
– localized defects limited to certain areas of the sample are visible to the naked eye under standard illumination (<500 lux), and
−−: defects extending over the entire surface of the sample are perceptible to the naked eye under standard illumination (<500 lux).

TABLE 1

|  | Ex 1 | Ex 2 | CEx 1 | CEx 2 | CEx 3 |
|---|---|---|---|---|---|
| Absorption of laser radiation (%) | >80% | >90% | <50% | <30% | <20% |
| Laser power (W/cm) | 200 | 150 | 320 | 320 | 320 |
| Gain (%) | 22 | 22 | 21 | 20 | 20 |
| Visibility of defects | + | ++ | − | − − | − − |

The five samples have, after heat treatment, approximately equivalent values of light absorption and resistance per square. Defects due to treatment inhomogeneities are significantly less visible for Examples 1 and 2 according to the invention as compared with the comparative examples.

The invention claimed is:

1. A process for obtaining a material comprising a substrate coated on one of its sides with a coating comprising a functional layer, said process comprising:
    depositing the functional layer on the substrate, then
    depositing an absorbent layer on top of said functional layer, then
    performing a heat treatment by radiation to heat said functional layer, said radiation having at least one treatment wavelength comprised between 200 and 2500 nm, said absorbent layer including a first main face that faces the functional layer and a second main face, opposite the first main face, in direct contact with air during the heat treatment, and
    eliminating the absorbent layer,
    wherein the absorbent layer absorbs at least 80% of the radiation used during the heat treatment and transmits less than 10% thereof,
    wherein the absorbent layer comprises at least 7% by weight of a radiation-absorbing agent, and
    wherein the radiation-absorbing agent is dispersed in an organic matrix.

2. The process as claimed in claim 1, wherein the organic matrix is based on a polymer which is soluble in water, dispersible in water and/or eliminable by thermal decomposition at least in part during the heat treatment.

3. The process as claimed in claim 2, wherein the polymer is selected from polymers comprising one or more starch homopolymers or copolymers, casein, acrylates, acrylamide, glycols, vinyl acetate, vinyl alcohol, vinyl pyrrolidone, styrene/acrylic acid copolymers, ethylene/acrylic acid copolymers, and cellulose or derivatives thereof.

4. The process as claimed in claim 3, wherein the glycol is ethylene glycol.

5. The process as claimed in claim 1, wherein the organic matrix is based on acrylate polymer.

6. The process as claimed in claim 5, wherein the acrylate polymer is obtained by polymerization of (meth)acrylate compounds selected from monomers, oligomers, prepolymers or polymers comprising at least one (meth)acrylate function.

7. The process as claimed in claim 1, wherein the absorbent layer has a thickness of 1 to 50 µm.

8. The process as claimed in claim 1, wherein the absorbent layer comprises at least 50% by weight of the radiation-absorbing agent.

9. The process as claimed in claim 8, wherein the absorbent layer has a thickness of 0.5 to 5 µm.

10. The process as claimed in claim 1, wherein the radiation-absorbing agent is selected from carbon particles.

11. The process as claimed in claim 10, wherein the carbon particles are particles of carbon black, graphite, graphene, carbon nanotubes, or mixtures thereof.

12. The process as claimed in claim 10, wherein the radiation-absorbing layer comprises at least 50% by weight of the radiation-absorbing agent.

13. The process as claimed in claim 1, wherein the radiation is selected from laser radiation, radiation from an infrared lamp or radiation from a flash lamp.

14. The process as claimed in claim 1, wherein the process is devoid of a washing step between the heat treatment and a subsequent storage of the coated substrate.

15. The process as claimed in claim 1, wherein a maximum temperature to which each point of the coating is subjected during said heat treatment is at least 300° C. and less than 800° C.

16. The process as claimed in claim 1, wherein the absorbent layer comprises at least 10% by weight of the radiation-absorbing agent.

17. The process as claimed in claim 1, wherein the absorbent layer is eliminated during the heat treatment.

18. The process as claimed in claim 1, wherein the functional layer has a thickness between 1 nm and 5 µm.

19. A process for obtaining a material comprising a substrate coated on one of its sides with a coating comprising a functional layer, said process comprising:
    depositing the functional layer on the substrate, then
    depositing an absorbent layer on top of said functional layer, then
    performing a heat treatment by laser radiation to heat said functional layer, said laser radiation having at least one treatment wavelength comprised between 200 and 2500 nm, said absorbent layer including a first main face that faces the functional layer and a second main face, opposite the first main face, in direct contact with air during the heat treatment, and
    eliminating the absorbent layer,
    wherein, for a laser radiation with a wavelength of 980 nm and a laser linear power of 200 W/cm, the absorbent layer absorbs at least 80% of the laser radiation used during the heat treatment and transmits less than 10% thereof, and
    wherein the absorbent layer comprises radiation-absorbing agent dispersed in an organic matrix.

* * * * *